Patented Oct. 10, 1950

2,525,144

UNITED STATES PATENT OFFICE 2,525,144

MANUFACTURE OF IMPROVED SOLID PHOSPHORIC ACID CATALYST

Julian M. Mavity, Hinsdale, Ill., assignor to Universal Oil Products Company, Chicago, Ill., a corporation of Delaware No Drawing. Application August 26, 1948,
Serial No. 46,371

10 Claims. (Cl. 252—428)

This invention relates to the manufacture of catalysts useful in accelerating various types of reactions among organic compounds. In a more specific sense, the invention is concerned with the production of a particular type of solid catalyst which has special properties both in regard to its activity in accelerating and directing olefin polymerization reactions, in its stability in service, and in its relatively low corrosive properties when employed in ordinary commercial apparatus comprising various types of steel.

An object of this invention is a method of producing a hydrocarbon conversion catalyst which has a high crushing strength after use.

Another object of this invention is a highly active catalyst suitable for use in the polymerization of olefinic hydrocarbons and in other hydrocarbon conversion reactions involving olefins.

One specific embodiment of this invention relates to a process for manufacturing a solid catalyst which comprises mixing a phosphoric acid, a siliceous adsorbent, and a member of the group consisting of a fatty acid containing at least 10 carbon atoms per molecule and a salt of said fatty acid and of a member selected from the group consisting of aluminum, and metals of group II of the periodic table, drying and calcining the resultant mixture.

Another embodiment of this invention relates to a process for manufacturing a solid catalyst which comprises mixing a phosphoric acid, a siliceous adsorbent, and a fatty acid containing at least 10 carbon atoms per molecule, drying and calcining the resultant mixture.

A further embodiment of this invention relates to a process for manufacturing a solid catalyst which comprises mixing a phosphoric acid, a siliceous adsorbent, and an aluminum salt of a fatty acid containing at least 10 carbon atoms per molecule.

A still further embodiment of this invention relates to a process for manufacturing a solid catalyst which comprises mixing a phosphoric acid, a siliceous adsorbent and a salt of a group II metal and of a fatty acid containing at least 10 carbon atoms per molecule, drying and calcining the resultant mixture.

An additional embodiment of this invention relates to a process for manufacturing a solid catalyst which comprises mixing a phosphoric acid, a diatomaceous earth, an aluminum stearate to form a composite, shaping said composite into particles, drying and calcining said particles.

The essential and active ingredient of the solid catalysts which are manufactured by the present process for use in organic reactions is an acid of phosphorus, preferably one in which the phosphorus has a valence of 5. The acid may constitute 60% to about 75% or more of the catalyst mixture ultimately produced, and in most cases is over 50% by weight thereof. Of the various acids of phosphorus, ortho-phosphoric acid ($H_3PO_4$) and pyrophosphoric acid ($H_4P_2O_7$) find general application in the primary mixtures, due partially to their cheapness and to the readiness with which they may be procured although the invention is not restricted to their use but may employ any of the other acids of phosphorus insofar as they are adaptable. It is not intended to infer, however, that the different acids of phosphorus, which may be employed will produce catalysts which have identical effects upon any given organic reaction as each of the catalysts produced from different acids and by slightly varied procedure will exert its own characteristic action.

In using ortho-phosphoric acid as a primary ingredient, different concentrations of the aqueous solution may be employed from approximately 75 to 100% or acid containing some free phosphorus pentoxide may even be used. (By this is meant that the ortho acid may contain a definite percentage of the pyro acid corresponding to the primary phase of dehydration of the ortho phosphoric acid.) Within these concentration ranges, the acids will be liquids of varying viscosities and readily incorporated with adsorbent materials. In practice it has been found that pyrophosphoric acid corresponding to the formula $H_4P_2O_7$ can be incorporated with siliceous adsorbents at temperatures somewhat above its melting point (142° F.) and that the period of heating which is given to the pyro acid-adsorbent mixtures may be different from that employed with the ortho acid.

Triphosphoric acid which may be represented by the formula $H_5P_3O_{10}$ may also be used as a starting material for preparation of the catalysts of this invention. These catalytic compositions may also be prepared from the siliceous materials mentioned herein and phosphoric acid mixture containing ortho-phosphoric, pyro-phosphoric, tri-phosphoric, and other poly-phosphoric acids.

Another acid of phosphorus which may be employed in the manufacture of composite catalysts according to the present invention is tetra-phosphoric acid. It has the general formula $H_6P_4O_{13}$ which corresponds to the double oxide formula $3H_2O.2P_2O_5$ which in turn may be considered as the acid resulting when three molecules of water are lost by four molecules of ortho-phosphoric acid H₃PO₄. The tetra-phosphoric acid may be manufactured by the gradual and controlled dehydration by heating of ortho-phosphoric acid or pyro-phosphoric acid or by adding phosphorus pentoxide to these acids in proper amounts. When the latter procedure is followed, phosphoric aldehyde is added gradually (while adsorbing heat of reaction) until it amount to 520% of the total water present. After a considerable period of standing at ordinary temperatures, the crystals of the tetra-phosphoric acid separate from the viscous liquid and it is found that these crystals melt at approximately 93° F. and have a specific gravity of 1.1886 at a temperature of 60° F. However, it is unnecessary to crystallize the tetra-phosphoric acid before employing it in the preparation of the solid catalyst inasmuch as the crude tetra-phosphoric acid mixture may be incorporated with the siliceous adsorbent and stearic acid or aluminum stearate.

The materials which may be employed as adsorbents or carriers for acids of phosphorus are roughly divided into two classes. The first class comprises materials of predominantly siliceous character and includes diatomaceous earth, kieselguhr, and artificially prepared porous silica. The second class of materials which may be employed either alone or in conjunction with the first class comprise generally certain members of the class of aluminum silicates and include such naturally occurring substances as various fuller's earth and clays such as bentonite, montmorillonite, acid treated clays and the like. Each adsorbent or supporting material which may be used alternatively will exert its own specific influence upon the net effectiveness of the catalyst composite which will not necessarily be identical with that of other members of the class.

Catalysts may be prepared from an acid of phosphorus such as ortho-phosphoric acid, pyrophosphoric acid, triphoshoric acid, or tetra-phosphoric acid, and a siliceous adsorbent containing a fatty acid containing at least 10 carbon atoms per molecule or an aluminum salt of a group II metal salt of said fatty acid by the successive steps of mixing the fatty acid or its salt with the siliceous material and thereafter mixing the phosphoric acid with the finely divided relatively inert carrier generally at an elevated temperature in the approximate range of 250° to 450° F. to form a rather wet paste (the acid ordinarily being in major proportion by weight). The resultant wet paste formed from the phosphoric acid, siliceous adsorbent, a fatty acid or its salt is then formed into shaped particles by extrusion or other suitable means and the resultant particles are then dried at a temperature of from about 350° to about 500° F. to form a substantially solid material which is then calcined further at a temperature generally of from about 500° to about 900° F. The calcining may be carried out by heating in a substantially inert gas, much as air, nitrogen, and the like. The resultant catalyst which has been calcined is active for polymerizing olefinic hydrocarbons, particularly for polymerizing normally gaseous olefinic hydrocarbons to form normally liquid hydrocarbons suitable for use as constituents of gasoline. When employed in the conversion of olefinic hydrocarbons into polymers, the calcined catalyst formed as herein set forth, is preferably employed as a granular layer in a heated reactor, which is generally made from steel, and through which the preheated hydrocarbon fraction is directed. The solid catalyst of this process may thus be employed for treating mixtures of hydrocarbon vapors to effect olefin polymerization, but this same catalyst may also be used at operating conditions suitable for maintaining liquid phase operation during polymerization of olefinic hydrocarbons, such as butylenes, to produce gasoline fractions. Thus when employed in the polymerization of normally gaseous olefins, the formed and calcined catalyst particles are generally placed in a vertical, cylindrical treating tower and the olefin containing gas mixture is passed downwardly therethrough at a temperature of from about 350° to about 550° F. and at a pressure of 100 to about 300 pounds per square inch when dealing with olefin-containing materials such as stabilizer reflux which may contain from approximately 10 to 50% or more propylene and butylene. When operating on a mixture comprising essentially butanes and butylenes, this catalyst is effective at conditions favoring the maximum utilization of both normal butylenes and isobutylene which involves mixed polymerization at temperatures of from approximately 275° to about 325° F. and at pressures of from about 500 to about 1500 pounds per square inch.

In utilizing the catalyst of this invention for promoting miscellaneous organic reactions, the catalyst may be employed in essentially the same way as it is used when polymerizing olefins, in case the reactions are essentially vapor phase and it may be employed in suspension also in liquid phase in various type of equipment.

With suitable modifications in the details of operation, the present type of catalyst may be employed in a large number of organic reactions, including polymerization of olefins as already mentioned. Typical cases of reaction in which the present type of catalyst may be used are the alkylation of cyclic compounds with olefins, the cyclic compounds including aromatics, polycyclic compounds, naphthenes, and phenols; condensation reactions such as those occurring between ethers and aromatics, alcohols and aromatics, phenols and aldehydes, etc.; reactions involving the hydro-halogenation of unsaturated organic compounds, isomerization reactions, ester formation by the interaction of carboxylic acids and olefins, and the like. The specific procedure for utilizing the present type of catalyst in miscellaneous organic reactions will be determined by the chemical and physical characteristics and the phase of the reacting constituents.

During use of my catalysts in vapor phase polymerizations and other vapor phase treatments of organic compounds, it is advisable to add small amounts of moisture to prevent excessive dehydration and subsequent decrease in catalyst activities. In order to substantially prevent loss of water from the catalyst an amount of water or water vapor such as steam is added to the charged olefinic gas so as to substantially balance the vapor pressure of the catalyst. This amount of water vapor varies from about 0.1 to about 6% by volume of the organic material charged.

Solid phosphoric acid catalysts which have been prepared heretofore by calcining composites of a siliceous adsorbent and a phosphoric acid frequently lose their activities during polymerization use and also suffer a marked decrease in crushing strength due to softening of the catalyst. Such softening of the catalyst also results in short catalyst life inasmuch as the catalyst towers become plugged during use. I have found, however, that catalysts of good crushing strength may be produced by adding to the composite of phosphoric acid and diatomaceous earth a relatively small amount of a fatty acid, its aluminum salt, or group II metal salt in an amount generally from about 0.5 to about 5% by weight of the catalyst mixture. Such a catalyst containing a fatty acid compound also has a good crushing strength after it has been used in the polymerization reaction. Pyro-phosphoric acid-diatomaceous earth catalysts to which from about 1% to about 5% by weight of stearic acid or aluminum stearate has been added and then the resultant composite has been dried and calcined have been found to produce catalysts having a high crushing strength. These catalysts have then been tested in converting propylene into propylene polymers in rotatable steel autoclaves and found to retain this high crushing strength after such polymerization use in which 30 to 50% of the propylene charge was converted into liquid products.

The fatty acid compounds which are composited with a siliceous adsorbent and a phosphoric acid or mixture of phosphoric acids in my process contain at least 10 carbon atoms per molecule and comprise the fatty acids, their aluminum salts, and their group II metal salts. The saturated fatty acids so used thus include those that have melting points above about 25° C. and comprise capric, undecylic, lauric, tridecylic, myristic, pentadecylic, palmitic, margaric, and stearic acids.

Other aliphatic carboxylic acids containing at least 10 carbon atoms per molecule and including oleic, linoeic, and linolenic acids are also utilizable in this process, as such, or their salts of aluminum and group II metals.

Although the aluminum salts of saturated and unsaturated monocarboxylic acids containing at least 10 carbon atoms per molecule are preferred in this process, the salts of group II metals are also utilized. These metals include beryllium, magnesium, zinc, cadmium, and mercury and the alkaline earth metals, calcium, strontium, and barium. Radium is too rare and valuable for this purpose.

The following examples of the preparation of catalysts comprised within the scope of this invention and results obtained in their use for catalyzing polymerization of propylene are characteristic, although the exact details set forth are not to be construed as imposing undue limitations upon the generally broad scope of the invention.

The attached table shows comparative results obtained in autoclave tests on phosphoric acid-diatomaceous earth catalysts containing various concentrations of stearic acid and aluminum stearate. These catalyst activity tests were carried out by placing 10 grams of 5x5 mm. pellets of the catalyst and 100 grams of propane-propylene mixture (50-55% propylene content) in a rotatable steel autoclave of 850 cc. capacity rotated at a temperature of 450° F. for 2 hours. At the end of this time, determinations were made to indicate the percentage conversion of propylene into liquid polymers. Outstanding among these catalysts containing stearic acid and aluminum stearate are those prepared using 1% of stearic acid or 1% of aluminum stearate in the mixture of phosphoric acid and diatomaceous earth after which the mixture was calcined at a temperature of 860° F. for one hour. These catalysts converted 50% of the propylene into liquid products in the autoclave test and retained after use crushing strength of over 27 pounds. As a further comparison, commercial solid phosphoric acid catalysts prepared from diatomaceous earth and pyrophosphoric acid but containing no stearic acid or aluminum stearate, gave a propylene conversion of 66% in the autoclave test but showed an after test crushing strength of only 5.4 pounds for the catalyst particles.

Preparation of the catalyst containing about 1% stearic acid is described as follows: An intimate mixture of 50 grams of diatomaceous earth and 1.5 grams of stearic acid was further mixed thoroughly with 161 grams of 85% ortho-phosphoric acid. This mixture was heated over a water bath under an infra-red lamp until the consistency was suitable for pressing the paste-like material into the holes in a pill mold plate to form the catalyst into 5x5 mm. pellets. The filled molds were heated in an oven for about ½ hour at a temperature of 392° F., the pellets were then pressed out of the pill plate, and the pellets were dried for another hour at 392° F. and finally for one hour in a muffle furnace at 500° F. A sample of this catalyst was heated further in the muffle furnace for one hour at 860° F. The other catalysts containing aluminum stearate were prepared in a similar manner.

TABLE

*Activity tests on solid catalysts formed from phosphoric acid, a siliceous adsorbent and stearic acid or aluminum stearate*

[Test conditions: 10 grams catalyst, 100 grams propane-propylene feed (52-55 mole per cent C₃H₆), two hours at 450° F. (232° C.) in 850 cc. rotating autoclave.]

| Additive | Catalyst Calcined at 500° F. | | | |
|---|---|---|---|---|
| Per Cent [1] | 5 | | 1 | |
| | Per Cent Conv.[2] | C. S.,[3] lbs. after test | Per Cent Conv.[2] | C. S.,[3] lbs. after test |
| Stearic Acid | 36 | 22.2 | 30 | 15.4 |
| Aluminum Stearate | 34.5 | 20.4 | 26.6 | 13.5 |

| Additive | Catalyst Calcined at 860° F. | | | |
|---|---|---|---|---|
| Per Cent [1] | 5 | | 1 | |
| | Per Cent Conv.[2] | C. S.,[3] lbs. after test | Per Cent Conv.[2] | C. S.,[3] lbs. after test |
| Stearic Acid | 40.5 | 19.1 | 60 | 27+ |
| Aluminum Stearate | 38 | 23.4 | 52.5 | 27+ |

[1] Additive based on additive+phosphoric acid (calc. as H₃PO₄)+crude "Dicalite" (diatomaceous earth).
[2] Per cent Conversion of propylene.
[3] Per cent Peripheral crushing strength.

I claim as my invention:

1. In the manufacture of solid catalyst wherein a phosphoric acid is mixed with a siliceous adsorbent to form a wet paste which is dried and calcined, the method of increasing the crushing strength of the catalyst which comprises incorporating into said paste from about 0.5 to about 5% by weight of a member of the group consisting of fatty acids containing at least 10 carbon atoms per molecule and the aluminum and group II metal salts of said fatty acids.

2. In the manufacture of solid catalyst wherein a phosphoric acid is mixed with a siliceous adsorbent to form a wet paste which is dried and calcined, the method of increasing the crushing strength of the catalyst which comprises incorporating into said paste from about 0.5 to about 5% by weight of a fatty acid containing at least 10 carbon atoms per molecule.

3. In the manufacture of solid catalyst wherein a phosphoric acid is mixed with a siliceous adsorbent to form a wet paste which is dried and calcined, the method of increasing the crushing strength of the catalyst which comprises incorporating into said paste from about 0.5 to about 5% by weight of an aluminum salt of a fatty acid containing at least 10 carbon atoms per molecule.

4. In the manufacture of solid catalyst wherein a phosphoric acid is mixed with a siliceous adsorbent to form a wet paste which is dried and calcined, the method of increasing the crushing strength of the catalyst which comprises incorporating into said paste from about 0.5 to about 5% by weight of a group II metal salt of a fatty acid containing at least 10 carbon atoms per molecule.

5. In the manufacture of solid catalyst wherein a phosphoric acid is mixed with a siliceous adsorbent to form a wet paste which is dried and calcined, the method of increasing the crushing strength of the catalyst which comprises incorporating into said paste from about 0.5 to about 5% by weight of stearic acid.

6. In the manufacture of solid catalyst wherein a phosphoric acid is mixed with a siliceous adsorbent to form a wet paste which is dried and calcined, the method of increasing the crushing strength of the catalyst which comprises incorporating into said paste from about 0.5 to about 5% by weight of aluminum stearate.

7. A process for manufacturing a solid catalyst which comprises mixing from about 50 to about 75% by weight of a phosphoric acid, from about 20 to about 49.5% by weight of a siliceous adsorbent, and from about 0.5 to about 5% by weight of a member of the group consisting of fatty acid containing at least 10 carbon atoms per molecule and the aluminum and group II metal salts of said fatty acid, drying and calcining the resultant mixture.

8. A process for manufacturing a solid catalyst which comprises mixing from about 50 to about 75% by weight of a phosphoric acid, from about 20 to about 49.5% by weight of a siliceous adsorbent, and from about 0.5 to about 5% by weight of a member of the group consisting of fatty acid containing at least 10 carbon atoms per molecule and the aluminum and group II metal salts of said fatty acid at a temperature of from about 250° to about 450° F. to form a composite, drying said composite at a temperature of from about 350° to about 500° F., and calcining the dried composite at a temperature of from about 500° to about 900° F.

9. A process for manufacturing a solid catalyst which comprises mixing from about 50 to about 75% by weight of a polyphosphoric acid, from about 20 to about 49.5% by weight of diatomaceous earth, and from about 0.5 to about 5% by weight of stearic acid at a temperature of from about 250° to about 450° F. to form a composite, shaping said composite into particles, drying said particles at a temperature of from about 350° to about 500° F. and calcining the dried particles at a temperature of from about 500° to about 900° F.

10. A process for manufacturing a solid catalyst which comprises mixing from about 50 to about 75% by weight of a poly-phosphoric acid, from about 20 to about 49.5% by weight of diatomaceous earth, and from about 0.5 to about 5% by weight of aluminum stearate at a temperature of from about 250° to about 450° F. to form a composite, shaping said composite into particles, drying said particles at a temperature of from about 350° to about 500° F. and calcining the dried particles at a temperature of from about 500° to about 900° F.

JULIAN M. MAVITY.

REFERENCES CITED

The following references are of record in the file of this patent:

UNITED STATES PATENTS

| Number | Name | Date |
|---|---|---|
| 1,993,513 | Ipatieff | Mar. 5, 1935 |
| 2,018,065 | Ipatieff | Oct. 22, 1935 |
| 2,102,073 | Ipatieff et al. | Dec. 14, 1937 |
| 2,120,723 | Watson | June 14, 1938 |
| 2,126,282 | Rose | Aug. 9, 1938 |
| 2,211,208 | Ipatieff et al. | Aug. 13, 1940 |
| 2,233,144 | Pinkerton et al. | Feb. 25, 1941 |
| 2,275,182 | Ipatieff et al. | Mar. 3, 1942 |